US012763054B2

(12) United States Patent
Kuno

(10) Patent No.: US 12,763,054 B2
(45) Date of Patent: Oct. 13, 2026

(54) ELECTRONIC STRINGED INSTRUMENT, MUSICAL SOUND CONTROL METHOD AND RECORDING MEDIUM

(71) Applicant: CASIO COMPUTER CO., LTD., Tokyo (JP)

(72) Inventor: Toshiya Kuno, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1003 days.

(21) Appl. No.: 17/987,245

(22) Filed: Nov. 15, 2022

(65) Prior Publication Data

US 2023/0186885 A1 Jun. 15, 2023

(30) Foreign Application Priority Data

Dec. 9, 2021 (JP) ................................ 2021-199714

(51) Int. Cl.
*G10H 3/18* (2006.01)

(52) U.S. Cl.
CPC ............. *G10H 3/181* (2013.01); *G10H 3/186* (2013.01)

(58) Field of Classification Search
CPC ............................... G10H 3/181; G10H 3/186
USPC ............................................................ 84/726
See application file for complete search history.

(56) References Cited

FOREIGN PATENT DOCUMENTS

| | | | | |
|---|---|---|---|---|
| JP | H8-160943 | A | | 6/1996 |
| JP | H9-106275 | A | | 4/1997 |
| JP | 09-288483 | A | | 11/1997 |
| JP | 2002251182 | A | * | 9/2002 |
| JP | 2002-287749 | A | | 10/2002 |
| JP | 3843749 | B2 | * | 11/2006 |
| WO | 2016/035143 | A1 | | 6/2017 |

OTHER PUBLICATIONS

Japanese Office Action dated Oct. 29, 2024 in a counterpart Japanese patent application No. 2023-214347. (A machine translation (not reviewed for accuracy) attached.).

* cited by examiner

*Primary Examiner* — Jianchun Qin
(74) *Attorney, Agent, or Firm* — CHEN YOSHIMURA LLP

(57) ABSTRACT

An electronic stringed instrument includes: at least one linear string member to be plucked by a user; a plurality of string support members each supporting the string member at different positions in a longitudinal direction of the string member, each of the string support members being individually deformable in accordance with a plucking of the string member by the user; a plurality of sensors that output signals indicating respective deformation states of the plurality of string support members, wherein the respective deformation states of the plurality of string support members may be different from each other depending on a way the string member is plucked; and at last one processor configured to generate a musical tone control signal based on the signals output from the plurality of sensors.

18 Claims, 11 Drawing Sheets

ELECTRONIC STRINGED INSTRUMENT, MUSICAL SOUND CONTROL METHOD AND RECORDING MEDIUM

BACKGROUND OF THE INVENTION

Technical Field

The present invention relates to an electronic stringed musical instrument, a musical sound control method, and a recording medium therefor.

Background Art

Electronic stringed instruments detect manipulation (plucking) of strings or members corresponding to strings and electrically generate musical tones based on the detected signals. There are various types of electronic stringed instruments. First, there is a type that follows the structure of an existing actual acoustic musical instrument and only detects the vibration of the string using a sensor and an electronic circuit.

Another type of electronic stringed instrument is one that does not follow the structure of an acoustic instrument as is, but has its own operating elements and sensing devices instead of actual strings. For example, there has been known an instrument in which flexible projections are used as performance operators as corresponding to strings to be plucked and contact points provided at the base of the projections are contacted when the projections are knocked down to produce sounds.

Japanese Patent Application Laid-Open No. 2002-251182 describes a guitar-type electronic stringed instrument having string members imitating the strings of an acoustic musical instrument. The string member in JP-A-2002-251182 is different from an actual guitar string in terms of support structure and extension length, but the plucking position and the direction of the plucked string with respect to the string member are similar to those of a guitar. Therefore, for users who have experience using guitars, the structure is such that they feel little discomfort when playing.

SUMMARY OF THE INVENTION

Features and advantages of the invention will be set forth in the descriptions that follow and in part will be apparent from the description, or may be learned by practice of the invention.

The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic stringed instrument, comprising: at least one linear string member to be plucked by a user; a plurality of string support members each supporting the string member at different positions in a longitudinal direction of the string member, each of the string support members being individually deformable in accordance with a plucking of the string member by the user; a plurality of sensors that output signals indicating respective deformation states of the plurality of string support members, wherein the respective deformation states of the plurality of string support members may be different from each other depending on a way the string member is plucked; and at last one processor configured to generate a musical tone control signal based on the signals output from the plurality of sensors.

In another aspect, the present disclosure provides a method performed by at least one processor in an electronic stringed instrument that includes, in addition to at least one processor, at least one linear string member to be plucked by a user; a plurality of string support members each supporting the string member at different positions in a longitudinal direction of the string member, each of the string support members being individually deformable in accordance with a plucking of the string member by the user; and a plurality of sensors that output signals indicating respective deformation states of the plurality of string support members, wherein the respective deformation states of the plurality of string support members may be different from each other depending on a way the string member is plucked, the method comprising, via the at least one processor: receiving the signals indicating the respective deformation states of the plurality of string support members outputted from the plurality of sensors; and generating a musical tone control signal based on the received signals.

In another aspect, the present disclosure provides a non-transitory computer-readable recording medium storing a program therein, the program being readable by at least one processor in an electronic stringed instrument that includes, in addition to at least one processor, at least one linear string member to be plucked by a user; a plurality of string support members each supporting the string member at different positions in a longitudinal direction of the string member, each of the string support members being individually deformable in accordance with a plucking of the string member by the user; and a plurality of sensors that output signals indicating respective deformation states of the plurality of string support members, wherein the respective deformation states of the plurality of string support members may be different from each other depending on a way the string member is plucked, the program being configured to causes the at least one processor to perform the following: receiving the signals indicating the respective deformation states of the plurality of string support members outputted from the plurality of sensors; and generating a musical tone control signal based on the received signals.

It is to be understood that both the foregoing general description and the following detailed description are exemplary and explanatory, and are intended to provide further explanation of the invention as claimed.

DETAILED DESCRIPTION OF EMBODIMENTS

Figure 1:
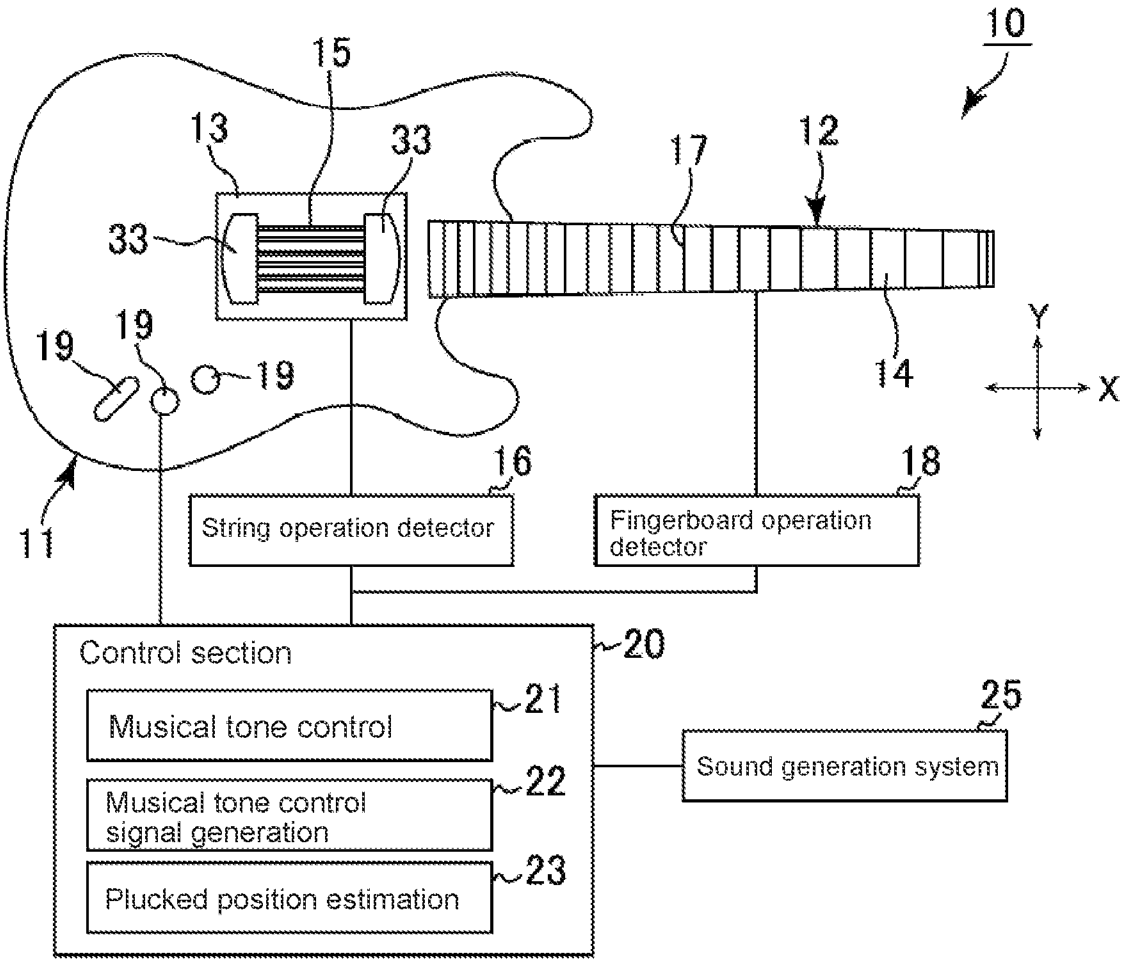
FIG. 1 shows the hardware structure of an electronic stringed instrument according to an embodiment of the present disclosure.

Hereinafter, embodiments of the present invention are described in detail with reference to drawings. FIG. 1 shows the hardware structure of an electronic stringed instrument 10 according to an embodiment of the present invention. The electronic stringed instrument 10 is composed of a musical instrument body and a control section 20. The instrument body of the electronic stringed instrument 10 is guitar-shaped and has a body portion 11 and a neck portion 12. A string operating portion 13 is provided on the front (outer surface) of the body portion 11, and a fingerboard 14 is provided on the front (outer surface) of the neck portion 12. Let the longitudinal direction of the rod portion 12 be the X-axis direction. When the electronic stringed instrument 10 is viewed from the front (FIG. 1), the directions perpendicular to the X-axis directions are defined as the Y-axis directions. Also, the directions perpendicular to both the X-axis directions and the Y-axis directions (the directions perpendicular to the paper surface of FIG. 1) are defined as the Z-axis directions.

The string operating section 13 includes a plurality of string members 15. The electronic stringed instrument 10 is modeled after a six-string guitar and has six string members 15 corresponding to the first through sixth strings of an actual guitar. The six string members 15 are arranged at predetermined intervals in the Y-axis direction, and each linearly extend in the X-axis direction. Unlike strings of a real guitar, each string member 15 is arranged only in a partial range of the body portion 11 in the X-axis direction, and the string member 15 does not extend to the region of the neck portion 12. In other words, when the electronic stringed instrument 10 is played, the string member 15 is not pressed on the fingerboard 14, and a pressing operation that simulates the string pressing operation for a real guitar is performed by the user on fingerboard 14.

The number of string members 15 is not limited to six. For example, the number of string members 15 can be appropriately selected according to the stringed instrument to be modeled, such as 12 strings corresponding to a 12-string guitar and 4 strings corresponding to a 4-string bass. The present invention is also applicable to the case where the number of string members 15 is singular. In other words, the present invention can be applied to any electronic stringed instrument having at least one string member.

The electronic stringed instrument 10 includes string operation detector 16 that detects the action of each string member 15 in the string operating section 13. Although FIG. 1 schematically illustrates the string operation detector 16 outside the instrument body, the string operation detector 16 is incorporated in the string operating section 13. The details of the string operation detector 16 will be described later, but when each string member 15 is plucked, it generates detection signals of output corresponding to the strength of the plucked string.

A plurality of fret portions 17 each extending in the Y-axis direction are formed on the fingerboard 14 at predetermined intervals in the X-axis direction. The neck portion 12 is partitioned into a plurality of regions in the X-axis direction by the plurality of fret portions 17. As in the case of a real guitar, the plurality of fret portions 17 indicate higher pitches toward the body portion 11 (toward the string operating section 13) in the X-axis direction, and indicate lower pitches toward the tip of the neck portion 12, thereby specifying various pitches. In addition, since the string members 15 do not extend to the area of the neck portion 12 and the string members 15 are not pressed to contact the fret portions 17 during playing, the fret portions 17 need not be physical projections on the fingerboard 14. The fret portions 17 of the electronic stringed instrument 10 function as target spots for the player when performing on the fingerboard 14.

The electronic stringed instrument 10 includes a fingerboard operation detector 18 that detects an operation on the fingerboard 14. In FIG. 1, the fingerboard operation detector 18 is schematically illustrated outside the instrument main body, but the fingerboard operation detector 18 is incorporated in the neck portion 12. Specifically, the fingerboard operation detector 18 is composed of a plurality of switches for detecting pressing force on the fingerboard 14, touch sensors for detecting finger contact with the fingerboard 14, or the like so as to detect which area of the plurality of areas partitioned in the X direction and the Y-axis direction in the form of grids on the fingerboard 14 has been pressed by the player. That is, on the fingerboard 14, which region between frets was operated (operation position in the X-axis direction) and which extension region of the six string members 15 was operated (operation position in the Y-axis direction) are detected by the fingerboard operation detector 18. The fingerboard operation detector 18 outputs a detection signal including the detected information on the operation position on the fingerboard 14.

A plurality of setting operation members 19 in the form of knobs and levers are provided on the outer surface of the body portion 11. By operating the setting operation members 19, it is possible to perform selection functions and adjust performance effects in the electronic stringed instrument 10.

A user (performer) who uses the electronic stringed instrument 10 presses an desired position on the fingerboard 14 with one hand (or treats it as an open string without pressing it) to select a pitch, and plucks a string member(s) 15 of the string operating section 13 with the other hand so as to execute a performance operation simulating a playing of a real guitar. The performance operations on the string members 15 and the fingerboard 14 are detected by the string operation detector 16 and the fingerboard operation detector 18, and detection signals from the string operation detector 16 and the fingerboard operation detector 18 are sent to the control section 20. Operation signals when the setting operation members 19 are operated are also input to the control section 20.

The control section 20 comprehensively controls the electronic stringed instrument 10, and includes at least one processor such as a CPU (Central Processing Unit) and a storage section in which programs are stored. Various controls related to the electronic stringed instrument 10 are executed by the processor performing arithmetic processing according to the program read from the storage unit.

The control section 20 may be installed in an external computer provided separately from the musical instrument main body, or may be installed in the musical instrument main body. When the controller 20 is installed in an external computer, the instrument body and the external computer are connected to each other so as to be communicable by wire or wirelessly so that detection signals from the string operation detector 16 and the fingerboard operation detector 18 are sent to the external computer.

A musical tone control process 21 and a musical tone control signal generating process 22 are included as functional blocks of the control section 20. The musical tone control process 21 is in charge of controlling the musical tones generated by the performance of the electronic stringed instrument 10, and generates musical tones from the sound source data stored in the control section 20 based on the content of the performance, and outputs musical tone signals to the sound generation system 25. The musical tone control signal generation process 22 has a function of generating musical tone control signals based on the detection signals output from the string operation detector 16 and the fingerboard operation detector 18. The musical tone control process 21 controls the generation of musical tones based on the musical tone control signals obtained from the musical tone control signal generation process 22.

In more detail, the musical tone control signal generation process 22 determines the presence or absence of the plucked string of each string member 15, the strength of the plucked string on the plucked string member 15, the plucked direction of the plucked string member 15, and the like based on detection signals output from the string operation detector 16.

Further, the musical tone control signal generation process 22 determines the presence or absence of a pressing operation on the fingerboard 14 and the location of the pressing operation on the basis of the detection signals from the fingerboard operation detector 18 so as to determine the specified pitch for every plucked string member 15. When the fingerboard 14 is pressed, the pitch is set to correspond to the fret portion 17 adjacent to the pressing operation position on the high range side (closer to the string operation section 13 in the X-axis direction). If no pressing operation to the fingerboard 14 is detected along the extension of a plucked string member 15, the pitch of the open string (open note) is set. In addition, in the case where the fingerboard 14 is depressed at multiple locations in the X-axis direction along the extension of one string member 15, the pitch is set with reference to the depression position on the highest range side.

When the string member 15 is plucked, the musical tone control signal generation process 22 generates musical tone control signals that include information on the strength and direction of the plucking of the string member 15 determined based on the detection signals from the string operation detector 16, and pitch information determined based on the detection signals from the fingerboard operation detector 18.

The musical tone control process 21 generates musical tone signals that can be processed by the sound generation system 25 by referring to information on the strength of the plucked string and the pitch contained in the musical tone control signals generated by the musical tone control signal generating process 22. The musical tone signal generated by the musical tone control process 21 is transmitted to the sound generation system 25. The sound generation system 25 includes an amplifier and an audio output section, and the musical tone signal is amplified by the amplifier and sent to the audio output section. The audio output section includes a speaker, a headphone terminal, etc., and emits musical sounds from the speaker or a headphone.

As described above, when the electronic stringed instrument 10 is played in a manner similar to playing a real guitar, musical tones reflecting the content of the performance are produced by electrical processing. In such an electronic stringed instrument 10, it is desirable that the operational feel during playing is excellent (there is little sense of discomfort in playing compared to playing in real stringed instruments) and that the player's performance (playing technique) can be accurately expressed. The product value can be improved by satisfying these requirements. The electronic stringed instrument 10 of this embodiment satisfies these requirements, as will be described in detail below.

Figure 2:
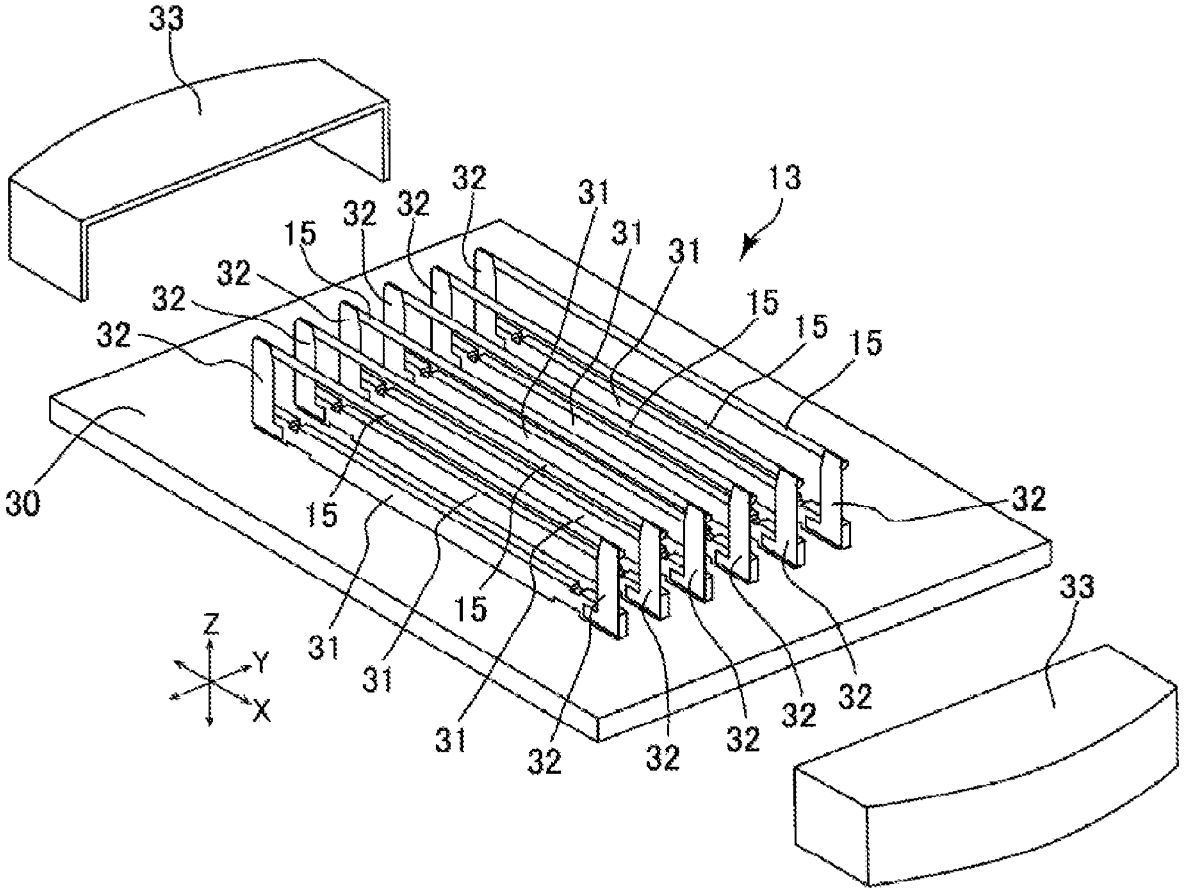
FIG. 2 is a perspective view showing a string operating section of the electronic stringed instrument of FIG. 1.

The configuration of the string operating section 13 will be described with reference to FIG. 2. The string operating section 13 has a base 30 supported on the front surface of the body section 11, and six string members 15 are supported on the base 30. Another configuration may be employed in which the support structure for the string member 15 is directly attached to the front surface of the body portion 11 without the base 30 interposed therebetween instead.

Six pedestal members 31 are fixed on the base 30. Each of the six pedestal members 31 is an elongated member whose longitudinal direction is oriented in the X-axis direction, and are arranged at predetermined intervals in the Y-axis direction. A pair of string support members 32 are attached near respective ends of each pedestal member 31 in the X-axis direction, and the pair of string support members 32 support one string member 15.

Both end portions of each string member 15 supported by the string support members 32 are covered with covers 33. FIG. 1 shows the state with the cover 33 being attached, and FIG. 2 shows the state with the cover 33 being removed. As shown in FIG. 1, the string support members 32 are hidden and protected by the cover 33, and only the six string members 15 are exposed so that they can be plucked.

The six string members 15 in the electronic stringed instrument 10 have the same specifications for the thickness, cross-sectional shape, length and the like. Each string member 15 is a linear member having a substantially circular cross-section perpendicular to the longitudinal direction and a uniform cross-sectional shape in the longitudinal direction.

The shape and structure of the string member 15 are not limited to this. The cross-sectional shape of the string member 15 perpendicular to the longitudinal direction may be an ellipse, an oval, a square, or the like. Also, the string member 15 may not have a uniform cross-sectional shape over the entire longitudinal direction, but may have different cross-sectional shapes in some parts thereof. Further, the string member 15 may have a hollow structure inside. Furthermore, in another configuration, the six string members 15 may differ from each other in specifications such as the thickness, cross-sectional shape, and roughness of the outer surface, etc.

The strings of actual stringed instruments flex themselves when plucked, and generate sound by vibrating when restoring from the flexed state. On the other hand, the string member 15 of the electronic stringed instrument 10 has a high rigidity so that it hardly bends under the force applied by plucking it. As a specific example, the string member 15 is made of a steel material like quenched tool steel, carbon steel wire such as piano wire, or a high-rigidity stainless steel.

Figure 3:
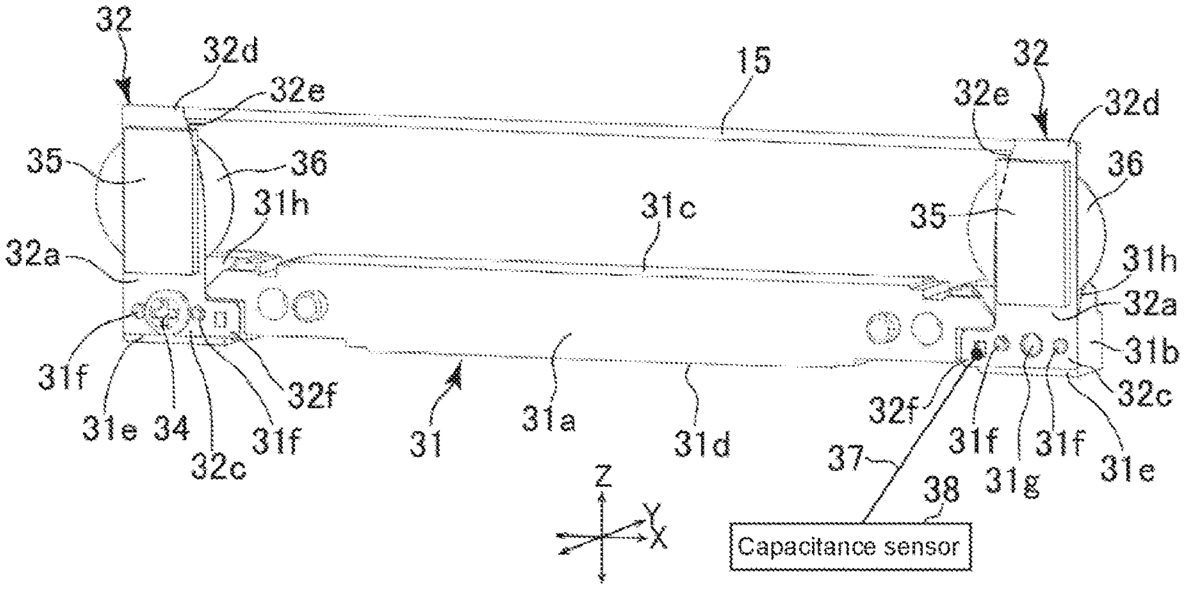
FIG. 3 is a perspective view showing a string member support structure of a first embodiment.
Figure 4:
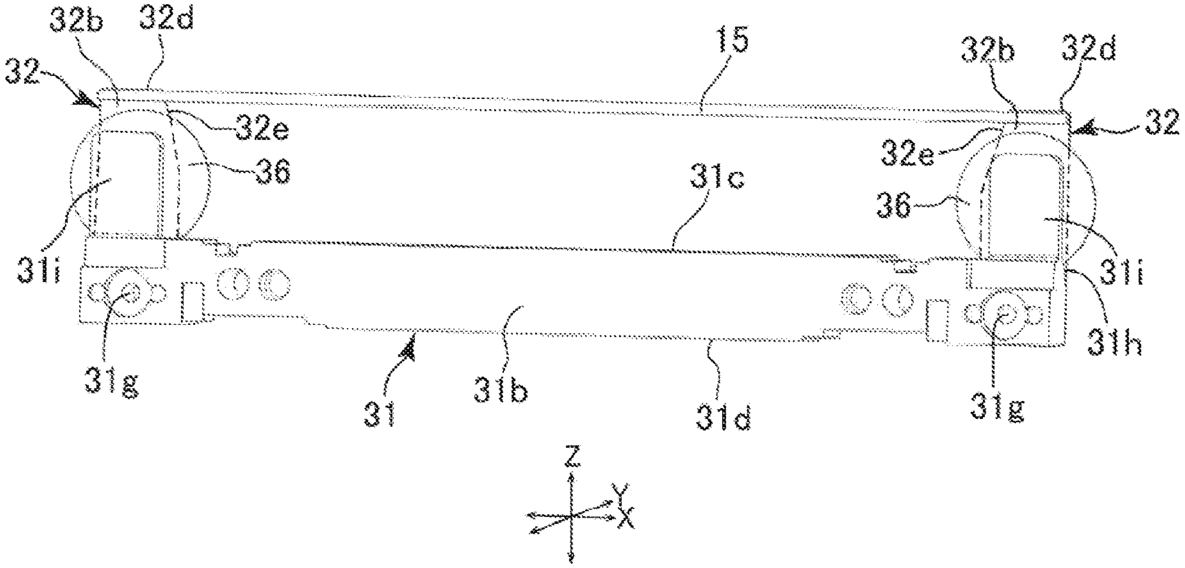
FIG. 4 is a perspective view showing the string member support structure of the first embodiment.

Details of the support structure of the string member 15 according to a first embodiment will be described with reference to FIGS. 3 and 4. FIGS. 3 and 4 show the support structure for one string member 15 viewed from one side and the other side, respectively, in the Y-axis direction. The other five string members 15 are also supported by the same structure as that shown in FIGS. 3 and 4.

The pedestal member 31 is made of a synthetic resin or metal, for example, and has rigidity such that it does not bend when the string member 15 is plucked. The pedestal member 31 has a generally quadrangular prism shape having a pair of side surfaces 31*a* and 31*b* facing in the Y-axis directions, and an upper surface 31*c* and a lower surface 31*d* facing in the Z-axis directions. The lower surface 31*d* is fixed to the base 30.

As shown in FIG. 3, a pair of recesses 31*e* formed by cutting out part of the side surface 31*a* are formed near respective ends of the pedestal member 31 in the X-axis direction. A pair of protrusions 31*f* protrude in the Y-axis direction from each recess 31*e*, and a screw hole 31*g* is formed between the pair of protrusions 31*f*. The pair of projections 31*f* and the screw holes 31*g* are arranged side by side in the X-axis direction. A tapered surface 31*h* is formed between the recess 31*e* and the upper surface 31*c*. The tapered surface 31*h* is an inclined surface that approaches the side surface 31*b* (reducing the distance from the side surface 31*b*) in the Y-axis direction as it moves away from the recess 31*e* and approaches the upper surface 31*c*.

A pair of string support members 32 are attached to the pair of recesses 31*e*, respectively, in the pedestal member 31. Each string support member 32 has a flat plate shape having a pair of side surfaces 32*a* and 32*b* facing in the Y-axis directions, and is attached to the pedestal member 31 so as to overlap the recess 31*e*.

A base end portion 32*c*, which is one end in the Z-axis direction of the string support member 32, is formed with a pair of engagement holes that engage with the pair of protrusions 31*f* and a through hole that overlaps with the screw hole 31*g*. The engagement with the protrusions 31*f* determines the position of the base end portion end 32*c*. Then, a fixing screw 34 is screwed into the screw hole 31*g* through the through-hole of the base end portion 32*c*, and the fixing screw 34 is tightened with a torque of a predetermined value or more so that the base end portion 32*c* is sandwiched between the head of the fixing screw 34 and the recess 31*e*, thereby fixing the string support member 32 to the pedestal member 31. FIG. 3 shows a state in which one of the pair of string support members 32 is fixed with the fixing screw 34 and the other string support member 32 is not yet fixed by the screw.

The pair of string support members 32 installed at the respective ends of the pedestal member 31 has a height that protrudes higher than the upper surface 31*c* in the Z-axis direction so that the pedestal member 31 and the pair of string support member 32 together form a U-shaped support structure. In each string support member 32, the front end side in the Z-axis direction opposite to the base end portion 32*c* serves as a string fixing portion 32*d* to which the string member 15 is attached. The string fixing portion 32*d* is a free end that is not fixed to the pedestal member 31. By fixing the respective ends of the string member 15 to the string fixing portions 32*d* of the pair of string support members 32, a support structure in which the string member 15 is bridged between the pair of string support members 32 is obtained.

The string support member 32 is a flexible leaf spring, and is easily elastically deformed in the Y-axis direction, which is the thickness direction. The base end portion 32*c* of the string support member 32 that is fixed to the pedestal member 31 is in contact with the recess 31*e*, and the portion above the base end portion 32*c* is elastically deformable. More specifically, in a free state where no external force is applied, the string support member 32 is self-supporting in a shape that rises vertically in the Z-axis direction from the base end portion 32*c*. When the string support member 32 receives an external force, the string fixing portion 32*d* side thereof can moves back and forth in the Y-axis direction (rocking) with the fixed base end portion 32*c* side serving as a fulcrum.

The string support member 32 has lower rigidity than the string member 15 so as to be more flexible. When the string member 15 is plucked, the string support members 32 preferentially bend while the string member 15 hardly bends, and the position of the string member 15 changes according to the bending of the string support members 32. Examples of materials for forming the string support member 32 having such properties include stainless steel, spring steel, spring copper alloys, and the like. The flat plate-shaped string support member 32 having a pair of side surfaces 32*a* and 32*b* directed in the Y-axis directions is particularly susceptible to bending when subjected to a force acting in the Y-axis directions.

The string fixing portion 32*d* and the string member 15 are firmly fixed so that force can be reliably transmitted to the string support member 32 without separation when the string member 15 is plucked. The fixing method (fixing structure) of the string member 15 to the string fixing portion 32*d* can be appropriately selected according to the materials of the string supporting member 32 and the string member 15 and the shape of the contact portion between the string fixing portion 32*d* and the string member 15. For example, welding (such as spot welding), soldering, gluing, screwing, crimping, or the like can be used to securely fix the string member 15 to the string support member 32.

In real stringed instruments played by flexing strings themselves, there are various parameters, such as the amount of displacement of the string caused by plucking, the reaction force at the time of plucking, the return time of the string due to the reaction force, the vibration of the string, and the damping mode of the vibration, that affect the player's feeling of performance. Although this depends on the type and tuning of the instrument, the real instrument is designed on the premise that it will be used with a relatively high string tension in order to obtain excellent sound quality and a good operational feel. Therefore, string support structures in real stringed instruments are required to have high strength and precision.

If an electronic stringed instrument is manufactured following the structure of such an actual stringed instrument, the structure that supports the string members becomes large and heavy, and the manufacturing cost increases. In addition, the precision and settings of the structural parts that need to withstand high tension to the string members are strict, and there is a risk that even a slight error in precision greatly affects the feeling of operation during performance.

On the other hand, in electronic stringed instruments, sound is not generated by the vibration of the string members themselves, so there is a degree of freedom in setting the tension of the string members. However, if the tension of the string member is weakened for the purpose of simplifying the support structure, etc., the parameters described above will differ greatly from those of real stringed instruments, adversely affecting the operational feeling when the strings are plucked, and there is a risk that the player will feel uncomfortable.

In this embodiment, when the string member 15 is plucked, the highly rigid string member 15 hardly bends, and the pair of string support members 32 that support the string member 15 deform in the direction in which the string is plucked, and then deform in the opposite direction due to the reaction force, thereby producing a rocking motion. The intensity and frequency of this rocking motion from the plucking is set according to the strength of the plucking. As a result, the string member 15 vibrates back and forth immediately after the string member is plucked. This action of the string member 15 is similar to the behavior of the actual string of a real stringed instrument when the string is plucked, and because the string member 15 does not bend excessively, the performance feeling similar to when playing an actual stringed instrument with high tensioned real strings can be given to the player. The present invention is advantageous in that it is possible to obtain a feeling of operation close to that of the strings of actual stringed instrument by the simple and inexpensive structure in which the string members 15 are supported by a pair of flexible string support members 32 without requiring a complicated and large structure for applying high tension to the string members 15.

Further, as will be described later, the string operation detector 16 outputs signals corresponding to deformation of the string support members 32. Therefore, if the string member 15 were more flexible and could be greatly flexed when the string is plucked, the flexure of the string support member 32 would be relatively reduced, and the output of the string operation detector 16 would possibly decrease. Or, the bending of the string member 15 would possibly destabilize the behavior of the string support member 32, degrading the output accuracy of the string operation detector 16. In this embodiment, the string support members 32 is flexed and the string member 15 is not flexed. Therefore, such problems can be avoided and high detection accuracy can be obtained.

The support structure for the string member 15 having the pair of string support members 32 is simple with a small number of parts. As for the individual parts, both the linear (rod-shaped) string member 15 and the leaf spring string support member 32 can be obtained at relatively low cost, and are easy to manufacture and assemble. Therefore, the manufacturing cost can be suppressed and the operational reliability and maintainability are excellent.

The string support member 32 has a generally rectangular shape with its longitudinal direction oriented in the Z-axis direction, but it is not a perfect rectangle; it has a tapered portion 32*e* on the side of the string fixing portion 32*d*, and a widened portion 32*f* is provided on the side of the base end portion 32*c*.

The tapered portion 32*e* has an inclined shape that gradually reduces the width of the string support member 32 in the X-axis direction toward the string fixing portion 32*d* in the Z-axis direction. The widened portion 32*f* protrudes in the X-axis direction from the base end portion 32*c* to increase the width of the string support member 32. That is, the string support member 32 is formed in a tapered shape such that the string fixing portion 32*d* has a smaller width in the X-axis direction than the base end portion 32*c*. Due to the shape of the string support member 32, the cross-sectional rigidity of the string fixing portion 32*d* side is slightly lower than that of the base end portion 32*c* side, and the deformation followability of the string support member 32 to the plucked string of the string member 15 is improved thereby. In addition, since the base end portion 32*c* is in contact with the recess 31*e* over a wide width, the support stability of the string support member 32 with respect to the pedestal member 31 is improved.

The tapered surface 31*h* formed on the pedestal member 31 functions as an interference preventing portion, allowing smooth bending of the string support member 32 without hindering its movement in the Y-axis direction. In particular, if the string support member 32 abutted against the pedestal member 31 at the base portion near the base end portion 32*c*, there would be a risk that the bending amount of the string support member 32 would be limited and the smoothness of the bending of the string support member 32 would be impaired. By forming the tapered surface 31*h* at a position close to the base end portion 32*c*, such a problem can be prevented.

An elastic body 35 is attached to the side surface 32*a* of the string support member 32. The elastic body 35 is made of an elastic material such as rubber or sponge, and contributes to noise suppression when the string member 15 is plucked. The cause of abnormal noise is collision noise caused by the string member 15 and/or the string support member 32 colliding with surrounding structures (including another string member 15 or another string support member 32 adjacent in the Y-axis direction). Also, there is vibration noise caused by characteristic vibrations (normal mode vibrations different from displacement due to plucked strings) occurring in the string member 15 and the string support member 32. By using the elastic body 35, which is softer than the string member 15 and the string support member 32, for the portion that could collide with the surrounding structures, the collision noise can be reduced. Moreover, by attaching the elastic body 35, the damping of the vibration of the string member 15 and the string support member 32 can be facilitated, and the vibration noise can be reduced.

As shown in FIG. 4, the pedestal member 31 is provided with a limit plate 31*i* protruding in the Z-axis direction from the upper surface 31*c*. The limit plate 31*i* is positioned facing the side surface 32*b* of the string support member 32, and a predetermined gap exists between the string supporting member 32 and the limit plate 31*i* in the Y-axis direction. The limit plate 31*i* limits the maximum deflection amount of the string support member 32 in the Y-axis direction.

Due to the structure in which the elastic body 35 and the limit plate 31*i* are arranged along the string support member 32, excessive deformation of the string support member 32 does not occur, and the plucking force on the string member 15 exceeding the allowable range can be absorbed.

Deformation (deflection) of the pair of string support members 32 when the string member 15 is plucked is detected by the string operation detector 16. A pair of piezoelectric sensors 36 are provided as a component of the string operation detector 16. A piezoelectric sensor 36 is attached to each of the pair of string support members 32, and respective deformations of the pair of string support members 32 are detected using the pair of piezoelectric sensors 36 at two locations spaced apart in the X-axis direction, respectively.

The piezoelectric sensor 36 has a flat plate shape and is attached to the side surface 32*b* of the string support member 32. In an initial state in which the string member 15 is not plucked and the string support member 32 is not swung in the Y-axis direction, there is a gap of a predetermined size in the Y-axis direction between the piezoelectric sensor 36 and the limit plate 31*i*.

The piezoelectric sensor 36 has a piezoelectric element (piezoelectric ceramics, etc.) that generates an electric charge when subjected to mechanical stress, and electrical terminals arranged on respective sides of the piezoelectric element so as to generate electromotive force when stress is applied to the piezoelectric element. When the string member 15 is plucked, the string support member 32 is bent in the direction of the plucked string and is flexed. When the string member 15 is plucked and the external force is thereafter released, the string support member 32 returns in the opposite direction to the plucked string due to the restoring force from the bending, and then vibrates while damping. Due to the bending and vibration of the string support member 32, the piezoelectric element of the piezoelectric sensor 36 is repeatedly bent in the forward and reverse directions, repeatedly generating positive and negative voltages each time. A waveform indicating this change in voltage is output from the piezoelectric sensor 36 as a detection signal and input to the control section 20.

The control section 20 determines the presence or absence of the plucked string and the strength of the plucked string based on the voltage waveform signal output by the piezoelectric sensor 36. Also, depending on the direction of plucking of the string member 15, the polarity direction of specific pulses in the voltage waveform output by the piezoelectric sensor 36 (for example, the first pulse representing the initial movement when the string is plucked and the nth pulse representing the restoration movement, etc.) is determined, and therefore, the control section 20 can analyze the waveform to determine the direction of the plucking.

In general, performers have their own playing habits. For example, when an attempt is made to make a stroke with a constant strength in the Y-axis direction, the plucking strengths for the respective string members often vary depending on whether the string is plucked from one side of the Y-axis direction or from the other side. By analyzing variations in output for each string plucking direction contained in the detection signal from the piezoelectric sensor 36, the musical tone control signal generation process 22 of the control section 20 may be configured to generate musical tone control signals in which the playing habit has been corrected, if desired.

By the way, in the case of an actual stringed instrument such as a real guitar, a portion where the player plucks the string extends over a predetermined range in the longitudinal direction of the string. Therefore, in the electronic stringed instrument 10 as well, it is necessary to secure a somewhat large range in the X-axis direction in which the string member 15 can be plucked in order to realize a playing style similar to that of the real guitar. Specifically, in the string operating section 13 shown in FIG. 1, the region where the string member 15 is exposed between the covers 33 on respective sides is the range in which the string members can be plucked.

Here, it is necessary to consider the possibility that the behavior of the string member 15 may differ depending on the position at which the string member 15 is plucked, even if the string member 15 is plucked with same strength and direction. That is, the string member 15, which has an elongated shape, is not always uniform in the magnitude and direction of displacement when the string is plucked at different positions along its entire length.

Figure 5A:
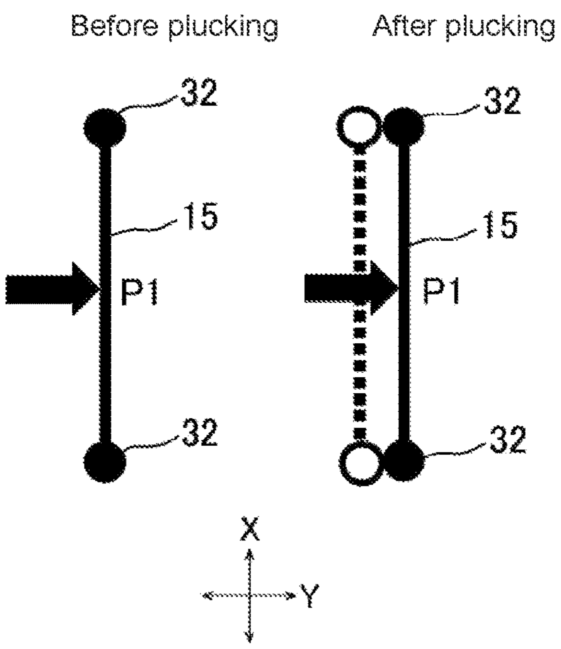
FIG. 5A is a diagram showing an action when a string member having the double-supported structure is plucked.

FIG. 5A schematically shows a case in which the strings are plucked on one side in the Y-axis direction at the central position P1 in the longitudinal direction (X-axis direction) of the string members 15 supported by a pair of string support members 32. In this case, the pair of string support members 32 supporting respective ends of the string member 15 are evenly bent, and the entire string member 15 is translated in the Y-axis direction. There is no fluctuation in the amount of movement at positions in the lengthwise direction. Therefore, it can be assumed that same detection results can be obtained regardless of which part of the string member 15 in the longitudinal direction the displacement is detected.

Figure 5B:
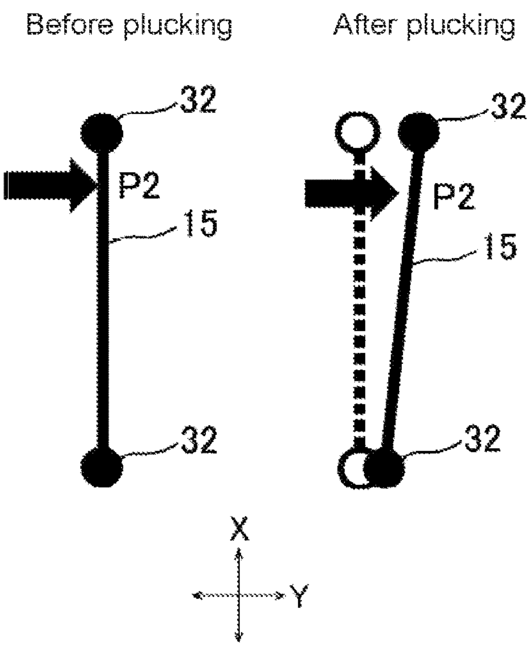
FIG. 5B is a diagram showing an action when the string member having the double-end structure is plucked.

FIG. 5B shows a case where a position P2 near one end in the longitudinal direction of the string member 15 is plucked to one side in the Y-axis direction. In this case, the magnitude of input to the pair of string support members 32 is biased, and the string support member 32 closer to the plucked position P2 has a greater amount of movement (deflection) in the Y-axis direction, and the string support member 32 farther from the plucked position P2 has a smaller amount of movement (deflection) in the Y-axis direction. As a result, the string member 15 is tilted and displaced non-parallel to the X-axis direction. Although FIG. 5B shows the initial movement of the string member 15 when the string is plucked, subsequent vibrations of the string member 15 also result in uneven movements non-parallel to the X-axis direction.

In the case of FIG. 5B, the detection results vary depending on which position in the longitudinal direction of the string member 15 the displacement is detected. In particular, if the detection is performed only near one of the ends in the longitudinal direction of the string member 15, the position with the largest variation in the amount of displacement will be detected. As a result, the detection result becomes inaccurate, and there is a risk that musical tones that do not properly reflect the performance played by the performer may be generated in the musical tone generation process based on the detection results.

Also, as a playing technique for an actual stringed instrument such as a real guitar, there is a technique in which the plucked position in the longitudinal direction of the strings is intentionally changed. For example, when the strings are plucked near the neck, the sound of the guitar becomes softer, and when the strings are plucked near the bridge, the sound becomes harder. So the guitar player may selectively play these positions in order to produce these effects. When the string member 15 is plucked this way, the displacement of the string member 15 also becomes that as shown in FIG. 5B. If the displacement of the string member 15 is detected at only one point in the longitudinal direction, it is difficult to discriminate the difference in the plucked position in the string member due to such performance intention.

As described above, if detection is performed only at one point in the longitudinal direction of the string member 15, there is a risk that the detection accuracy may vary and musical tones that are not intended by the player may be generated due to limitations in the detection characteristics.

Figure 6A:
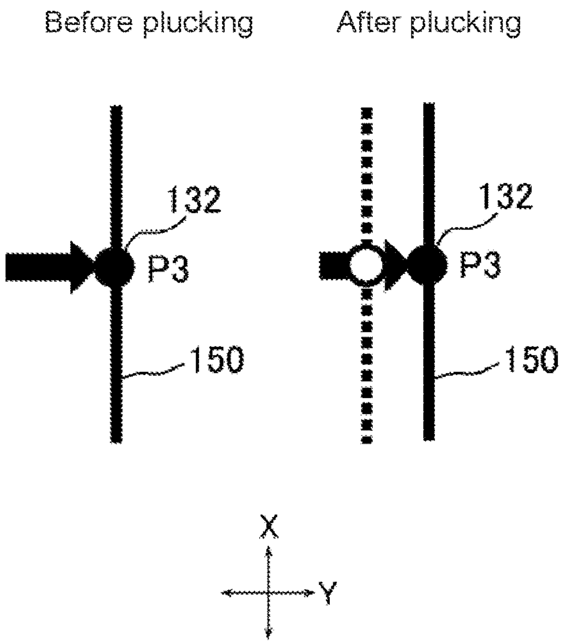
FIG. 6A is a diagram showing an action when a string member supported only at one point is plucked.
Figure 6B:
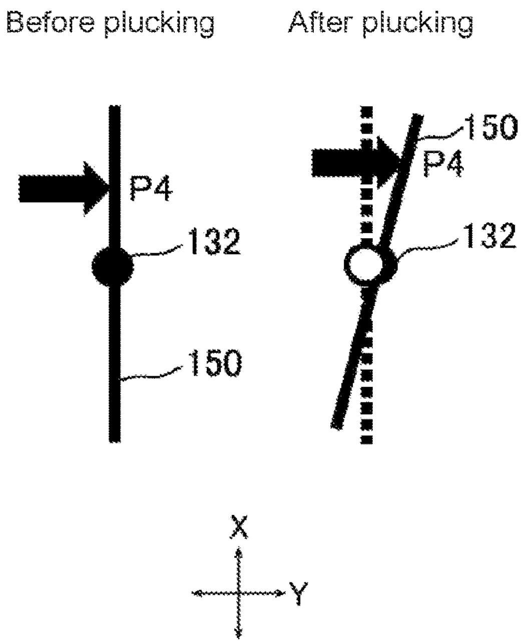
FIG. 6B is a diagram showing an action when the string member supported only at one point is plucked.

FIGS. 6A and 6B show another example in which accurate detection of operations on string members is difficult, and depicts a string member 150 supported by a support structure different from the support structure of the string members 15 shown in FIGS. 3 and 4. In this example, the string member 150 is supported by a string support member 132 only at one point near the center in the longitudinal direction. The string support member 132 is flexible like the string support member 32 described above, and the string member 150 is set to be less flexible than the string support member 132.

FIG. 6A shows the case where the string member 150 is plucked to one side in the Y-axis direction at the central position P3 in the longitudinal direction (the position supported by the string support member 132). When the string is plucked accurately at the position supported by the string support member 132 and a linear force is applied in the Y-axis direction, the entire string member 150 translates in the Y-axis direction as shown in FIG. 6A. In this case, it is assumed that there will be no variations in the amount of longitudinal movement of the string member 150 from place to place. However, such an input to the string member 150 is extremely rare for actual playing operations. Further, even if such an input is made, the structure in which only one string support member 132 supports the string member 150 tends to make the behavior of the string member 150 unstable, and does not necessarily work.

FIG. 6B shows a case where the string member 150 is plucked to one side in the Y-axis direction at a position P4 shifted in the X-axis direction from the position supported by the string support member 132. In this case, the string member 150 is tilted around the support position of the string support member 132, and with respect to one side and the other side in the X-axis direction around the support position of the string support member 132 as a boundary, the movement directions are reversed. Also, the amount of movement in the Y-axis direction is small at a position of the string member 150 near the string support member 132, and the amount of movement in the Y-axis direction increases as the distance from the string support member 132 approaches an end in the longitudinal direction. As a result, the detection results vary depending on at which position in the longitudinal direction of the string member 150 the displacement is detected. In particular, because the movement directions in the Y-axis direction are reversed on the respective sides of the support position of the string support member 132 in the X-axis direction, a detection error of detecting a plucking direction that is opposite to the actual plucking direction may occur.

For the above reasons, in order to improve the accuracy of detecting the string plucking performed on the string member in the electronic stringed instrument, the structure for supporting the string members and the position at which the behavior of the string member is detected are very important.

In this embodiment, since the string member 15 is supported by the string support members 32 at a plurality of different positions in the longitudinal direction, the reversal phenomenon of the moving direction of the string member 15 when the string is plucked, as shown in FIG. 6B, does not occur, and it is possible to align the movement direction as a whole. Therefore, it is possible to avoid detecting a direction of the plucked string that is opposite to the actual direction.

Also, by supporting the string member 15 at a plurality of positions, the stability of the support and the stability of the behavior when the string is plucked are excellent. In particular, because the string member 15 is supported by the pair of string support members 32 at the respective ends (two locations) in the longitudinal direction, and because there is no portion connecting to the string member 15 in the middle, the behavior of the string members 15 also become smooth as well as highly stable. In addition, because the wide area between the pair of string supports 32 can be effectively used as an area where the string members 15 can be plucked, there is no risk of disturbing the performance by the player's fingers or a pick touching the supporting structures such as the string support members 32. Therefore, the present embodiment is also excellent in terms of ease of playing.

The string operation detector 16 of the electronic stringed instrument 10 detects the deformations of the string support members 32 using a plurality of piezoelectric sensors 36, which individually detect deformations, whose positions are different in the longitudinal direction of the string member 15, and outputs signals corresponding to the deformations. Therefore, by referring to the detection results of the respective piezoelectric sensors 36 in the control section 20, the state of displacement of the string member 15 can be accurately identified and used for generating musical tones.

In particular, using a pair of piezoelectric sensors 36, the amount of deflection of the string support member 32 is independently detected near respective ends where the difference in displacement of the string member 15 could be the largest in the case shown in FIG. 5B, for example. Therefore, the present embodiment has the advantage of being able to determine the degree of the deformations with high accuracy. As a result, it is possible to detect, with high accuracy, the strength of the actual plucking of the string member 15, the plucked position with respect to the string member 15, and the like.

As an example of musical tone generation scheme using the output from the string operation detector 16, the musical tone control signal generation process 22 of the control section 20 may use an average value obtained by averaging the signals output from the pair of piezoelectric sensors 36 so as to determine displacement of the string member 15. By averaging the output from the piezoelectric sensor 36 attached to the string support member 32 on the side with the larger amount of deflection and the output from the piezoelectric sensor 36 attached to the string support member 32 on the other side with the smaller amount of deflection, for example, even if the string member 15 is plucked in any part within the possible range, a substantially constant sensor output will be obtained for plucking of similar strength. As a result, in this implementation example, the influence of variations in sensor output due to differences in plucked position is eliminated, and a musical tone control signal properly reflecting the strength of the string plucking on the string member 15 can be generated and can be used to control musical tones at the musical tone control process 21.

It should be noted that if the positive and negative voltage waveforms are output from the piezoelectric sensor 36 as is, the signal obtained from the pair of piezoelectric sensors 36 may not be the correct value if the outputs are simply averaged. In this case, additional processing such as averaging after rectifying the output of the piezoelectric sensor 36 by a bridge circuit may be performed.

As another example of musical tone generation scheme using the output from the string operation detector 16, the plucked position in the longitudinal direction of the string member 15 can be estimated based on the signals output from the pair of piezoelectric sensors 36, respectively, and a musical tone control signal reflecting differences in plucked positions can be generated. As a functional block to realize this, the control section 20 has a plucked position estimation process 23 (FIG. 1). Data representing changes in the outputs of the pair of piezoelectric sensors 36 for various plucked positions of the string member 15, an algorithm to determine the plucked position of the string member 15 from the contents of the outputs of the pair of piezoelectric sensors 36, and the like are pre-stored in the control section 20. The plucked position estimation process 23 individually acquires the detection signals output by the pair of piezoelectric sensors 36, compares the contents of the respective outputs, and perform prescribed calculation to estimate the plucked position of the string member 15 using the data and the algorithm described above. Then, the estimated plucked position information is sent to the musical tone control signal generation process 22.

For example, if the amplitude values of the detection signals output by the pair of piezoelectric sensors 36 are substantially the same, it can be estimated that the string member 15 has been plucked near the center. If the amplitude value of the detection signal output by one of the pair of piezoelectric sensors 36 is greater than the amplitude value of the other, it can be estimated that a position near the piezoelectric sensor 36 with the larger amplitude value of the detection signal is plucked. As the difference between the amplitude values of the detection signals output by the pair of piezoelectric sensors 36 increases, it can be estimated that the string member 15 is plucked at a portion of the string member 15 that is largely deviated from the center (at a portion near one end in the longitudinal direction).

The musical tone control signal generation process 22 may change the content of the musical tone control signal and/or adds additional information to the musical tone control signal based on the plucked position estimated by the plucked position estimation process 23, so that musical tone generated by the musical sound control process 21 reflects the plucked position of the string member.

For example, the musical tone control signal generation process 22 may generate a musical tone control signal so as to change the frequency characteristics of the musical tone in accordance with the difference in the plucked position of the string member 15 estimated by the plucked position estimation process 23. By changing the frequency characteristics this way, it is possible to adjust the hardness/softness of the sound. Therefore, it becomes possible to express differences in musical tone similar to that which would occur in an actual guitar between when the strings are plucked at a position near the neck and when the strings are plucked at a position near the bridge if the user plays the electronic stringed instrument 10 at different plucked positions of the string members 15.

In another example, the musical tone control signal generating process 22 can generate musical tone control signals so as to change the timbre according to the difference in the plucked position of the string member 15 estimated by the plucked position estimating process 23. The sound source data stored in the control section 20 includes various tone colors corresponding to different types of musical instruments and sound effects. Prescribed regions of the string member 15 to be plucked may be associated with different timbres included in the sound source data that are selected from a plurality of selectable timbres. For example, when a first region in the longitudinal direction of the string member 15 is plucked, the tone color of a first musical instrument is produced, and when a second region is plucked, the tone color of a second musical instrument is produced, and so on so forth. It should be noted that the use of tone colors is not limited to two types, and the pluckable string area of the string member 15 may be divided into three or more regions so that three or more types of timbres can be selectively played.

As can be seen from these control examples, by estimating the plucked position of the string member 15 and controlling the musical tones such that an effect according to the estimated plucked position is added, the range of possible performance expression is widened, and the product value of the electronic stringed instrument 10 is increased.

The electronic stringed instrument 10 may also be configured such that the user can select the type of musical tone control based on the outputs of the pair of piezoelectric sensors 36. For example, referring to the control examples described above, an averaging correction mode for averaging the outputs of the pair of piezoelectric sensors 36, a frequency characteristic change mode for changing the frequency characteristics of musical tones according to the difference in the plucked string position, and a timbre change mode for changing the timbre depending on the plucked position may be preset so that the user can select one of these modes by operating the setting operation member 19 as desired.

The use of the string operation detector 16 having a pair of piezoelectric sensors 36 is also applicable to tasks other than control of musical tones. For example, when the electronic stringed instrument 10 is used as a teaching material for performance practice, variations in the plucked positions, variations in the string plucking strength, etc., can be detected and reported to the user to enhance the learning effect. Alternatively, it is also possible to display the position of the string member 15 where the string is plucked on a monitor or the like to obtain a visual effect.

As a performance operation other than string plucking for stringed instruments, there is a mute operation in which the performer touches the strings to mute them. To detect such a muting operation, an electrical connection may be provided between the string members 15 and the string support members 32.

Specifically, the string member 15 and the string support member 32 are each made of a conductive material. Also, the portion where the string fixing portion **32*d* is fixed to the string member 15 is brought into conductive contact with each other by soldering or the like. As shown in FIG. 3, a capacitance sensor 38 is provided on the string support member 32, and a part of the string support member 32 (for example, the widened portion 32*f*) and the capacitance sensor 38 are connected by a lead wire 37. By connecting the lead wire 37 to the widened portion 32*f*, which is a part of the base end portion 32*c* fixed to the pedestal member 31, the lead wire 37 and the capacitance sensor 38 do not interfere deformation of the string support member 32** as obstacle or resistance.

In this case, in addition to the piezoelectric sensor 36, the capacitance sensor 38 also constitutes the string operation detector 16. The capacitance of each string member 15 when the player is not touching the string member 15 is measured in advance and stored in the storage unit of the control section 20, and is compared with difference in the capacitance of the string member 15 measured by the capacitance sensor 38 during the player's performance, thereby detecting whether or not the player is touching the string member 15. When a predetermined condition is satisfied, the musical tone control signal generation process 22 determines that a mute operation is being performed, and sends a musical tone control signal indicating the mute state to the musical tone control process 21. Based on this, the musical tone control process 21 executes the mute process so as to cut off the entire sound generation including the reverberant sound. The predetermined condition here indicating a mute operation may be, for example, when the player touches not only one string member 15 but also a preset number of plural string members 15 at the same time.

If it is not necessary to detect a mute operation on the string members 15, the capacitance sensor 38 can be omitted, or the string member 15 and the string support member 32 can be configured so as not to be electrically connected to each other. For example, the string member 15 and the string support members 32 can be made of a non-metallic material such as synthetic resin, and/or a non-conductive material can be placed at the connecting portion between the string member 15 and the string support members 32.

Figure 7:
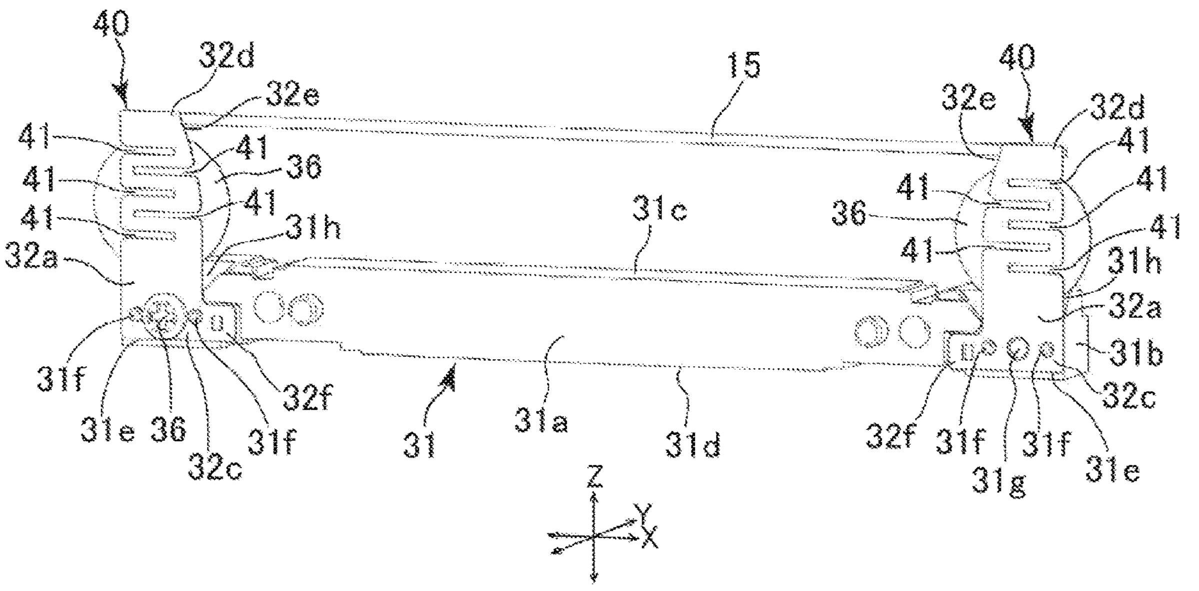
FIG. 7 is a perspective view showing the string member support structure of a second embodiment.
Figure 8:
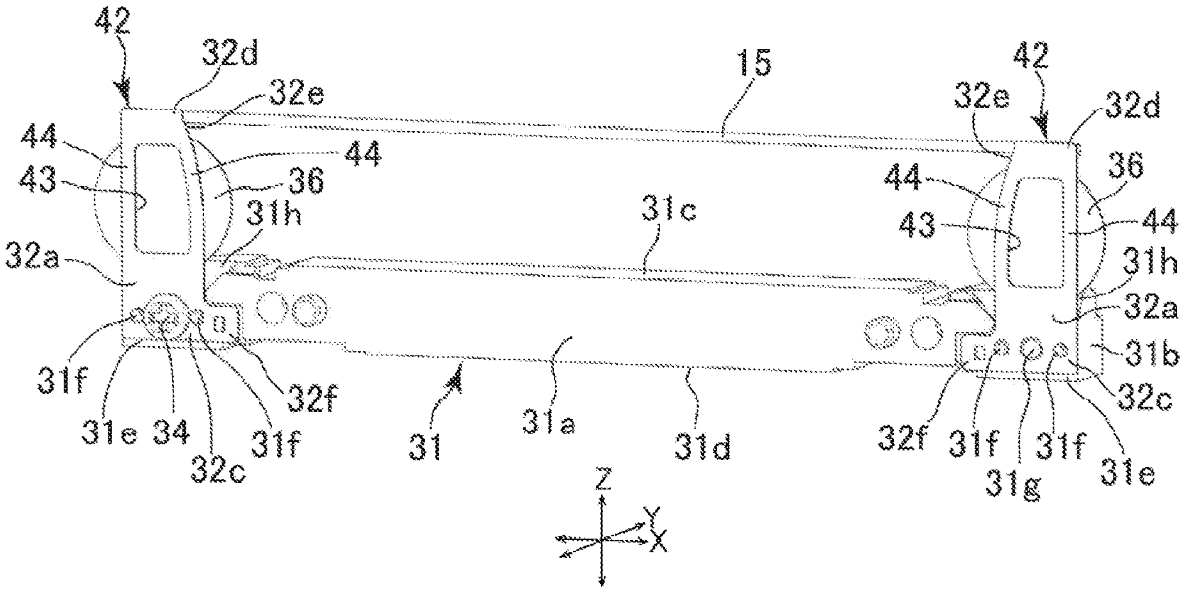
FIG. 8 is a perspective view showing the string member support structure of a third embodiment.

In the support structure for the string members 15 in the first embodiment shown in FIGS. 3 and 4, bending of the pair of string support members 32 occurs mainly in the Y-axis direction, and the string plucking in the Y-axis direction can be effectively detected. Different support structures for the string member 15 are shown as a second embodiment in FIG. 7 and as a third embodiment in FIG. 8. In FIGS. 7 and 8, elements common to the elements in FIGS. 3 and 4 are denoted by the same reference numerals, and description thereof is omitted.

A pair of string support members 40 in the second embodiment of FIG. 7 each have a plurality of slits 41 extending in the X-axis direction formed in the intermediate portion between the base end portion 32*c* and the string fixing portion 32*d*. The slit 41 is a groove that is open at one end in the X-axis direction and has a cutout halfway in the X-axis direction from the open portion. Five slits 41 are formed in each string support member 40 at predetermined intervals in the Z-axis direction, and the slits 41 adjacent to each other in the Z-axis direction are opened in opposite directions in the X-axis direction. By forming these slits 41, the portion between the base end portion 32*c* and the string fixing portion 32*d* becomes accordion-like, so that the string support member 40 can expand and contract in the Z-axis direction. Therefore, the string support member 40 is configured to easily deflect in the Z-axis direction in addition to bending in the Y-axis direction. In addition, it becomes easier to perform a twisting or like operation on the string support member 40 in various directions.

In the third embodiment of FIG. 8, each of the pair of string support members 42 has a through hole 43 formed in an intermediate portion between the base end portion 32*c* and the string fixing portion 32*d*, and a pair of bridging portions 44 are formed on respective sides of the through hole 43. By forming the through-hole 43, the flexibility of the string support member 42 is increased, and the degree of freedom in the bending direction is also increased. For example, because the pair of thin bridging portions 44 can be independently bent, operations to change the position of the string fixing portion 32*d* in the Z-axis directions, and an operation of twisting the string support member 42 in various directions can easily be performed.

The string support member 40 shown in FIG. 7 and the string support member 42 shown in FIG. 8 have higher degree of freedom in directions of bend as compared with the string support member 32 described above. Because of this, their deformations can easily follow the movement of the string member 15 even for operations other than plucking in the Y-axis directions. For example, the movement of the string member 15 can be made to correspond to slap playing that has a pressing component in the Z-axis direction. The piezoelectric sensors 36 attached to the string support member 40 and the string support member 42 are configured to detect deflection in the Z-axis direction also.

Although not shown in FIGS. 7 and 8, an elastic body similar to the elastic body 35 of the first embodiment (FIG. 3) may be attached to the string support member 40 and the string support member 42 to suppress noise and promote damping of vibration.

As described above, the direction of displacement of the string members to be detected in the present invention may be any direction that intersects the longitudinal direction of the string members, and therefore, is not limited to the direction in which a plurality of string members are arranged (Y-axis direction).

In the configurations of FIGS. 3, 4, 7 and 8, a pair of piezoelectric sensors 36 are used as the string operation detector 16, but it is also possible to use detectors other than piezoelectric sensors. For example, a pair of strain gauges attached to a pair of string support members 32, respectively, may constitute the string operation detector 16. The strain gauge measures changes in resistance value accompanying deformation of a resistor such as metal, and can detect deformation of the string support member 32 in the same or similar manner as the piezoelectric sensor 36 described above.

Figure 9:
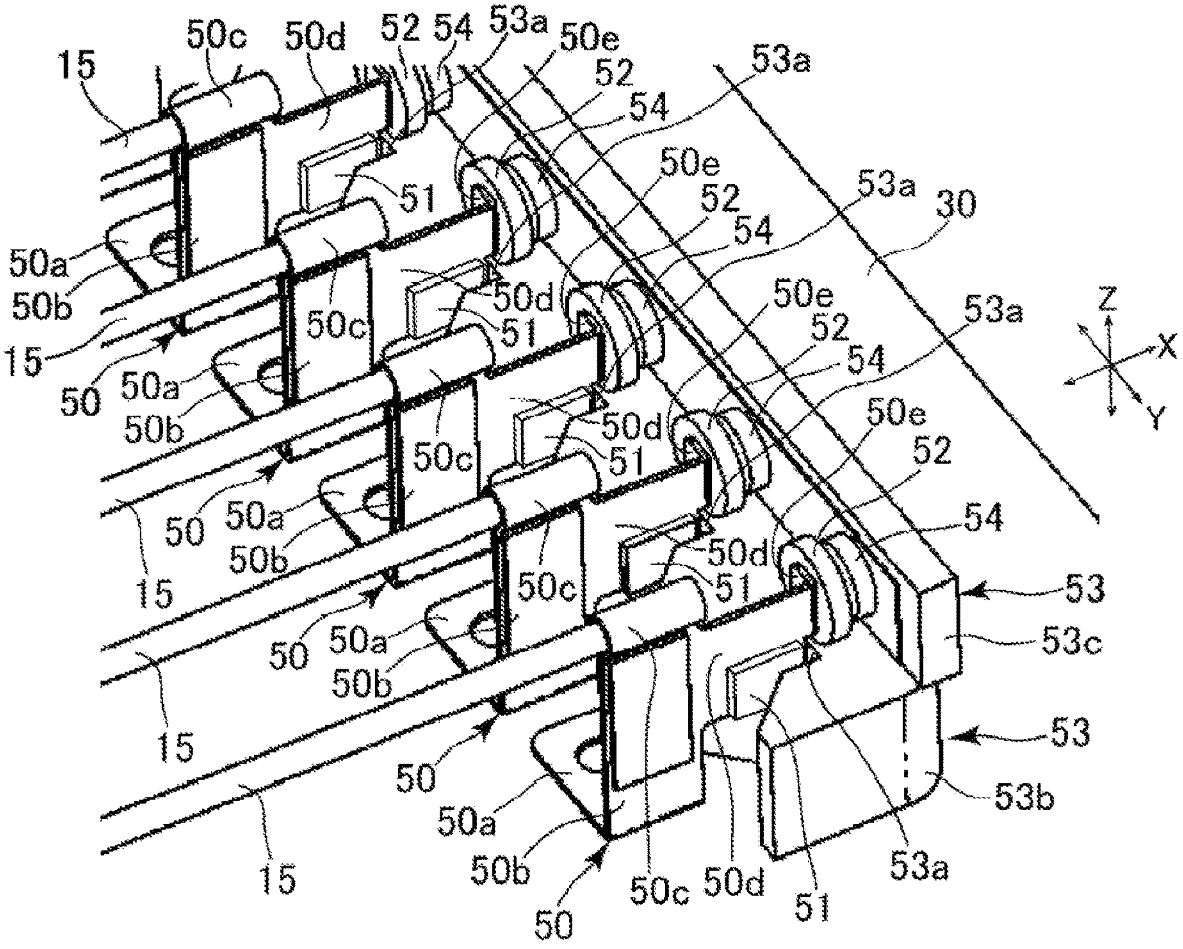
FIG. 9 is a perspective view showing the string member support structure of a fourth embodiment.
Figure 10:
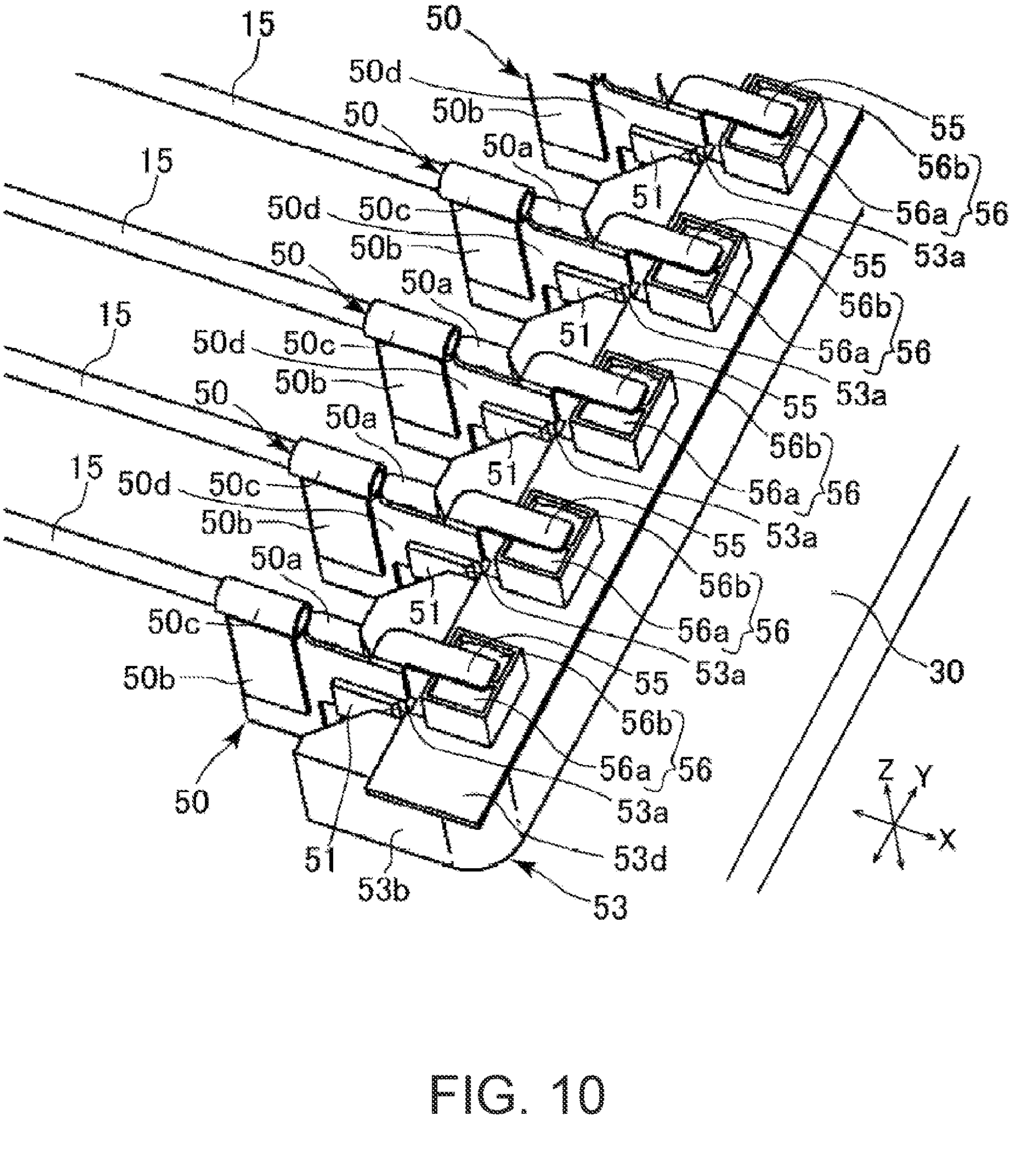
FIG. 10 is a perspective view showing the string member support structure of a fifth embodiment.
Figure 11:
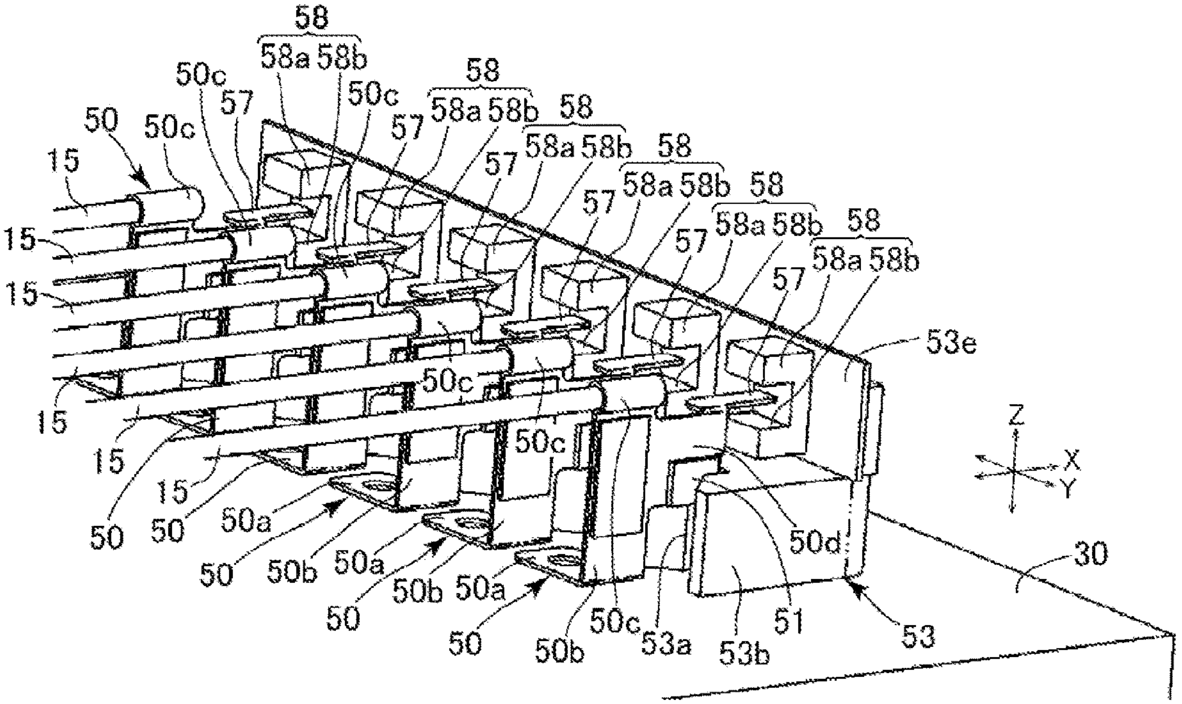
FIG. 11 is a perspective view showing the string member support structure of a sixth embodiment.

The support structure for the string members and the device for detecting the operation of the string members are not limited to those described above. Referring to FIGS. 9-11, other embodiments are described, which differ in the support structure for the string member and in the way by which the movement of the string member is detected. FIGS. 9 to 11 show only one longitudinal end of each string member 15, and the other end of each string member 15 is omitted. But the other end has same structure. The embodiments shown in FIGS. 9 to 11 are similar to the first to third embodiments described above in that the string member 15 is supported at respective ends by a pair of flexible string support members, and the movements of the respective string support members can be independently (individually) detected. Also, although some of the string members 15 are omitted in FIGS. 9 and 10, six string members 15 are arranged in the Y-axis direction in these embodiments.

In the fourth embodiment shown in FIG. 9, a pair of string support members 50 that support the vicinity of respective ends of each string member 15 are directly fixed on the base 30, and a member corresponding to the pedestal member 31 of the first to third embodiments is not provided. The string support member 50 has a leg portion 50*a* fixed on the base 30 and a plate-shaped standing wall portion 50*b* rising in the Z-axis direction from the leg portion 50*a*, and a cylindrical portion 50*c* is provided at the tip of the standing wall portion 50*b*. The cylindrical portion 50*c* has a cylindrical shape penetrating in the X-axis direction, and the end portion of the string member 15 is inserted into the cylindrical portion 50*c* so that the string member 15 and the cylindrical portion 50*c* are fixed to each other.

The string support member 50 has an extension portion 50*d* projecting in the X-axis direction from the standing wall portion 50*b*. A bending portion 50*e* that bends in the Y-axis direction is provided at the tip of the extension portion 50*d* in the X-axis direction. An elastic body 51 is attached to the side surface of the extension portion 50*d*. A permanent magnet 52 is attached to the bent portion 50*e*.

A sensor support member 53 is provided on the base 30. The sensor support member 53 is an elongated member extending in the Y-axis direction, and is arranged so as to straddle the extension portions 50*d* of the plurality (six) of the string support members 50.

The sensor support member 53 has grooves 53*a* at positions corresponding to the string support members 50, respectively. The groove portion 53*a* has a concave shape that is cut in the X-axis direction, and the extension portion 50*d* is inserted into the groove portion 53*a*. In the Y-axis direction, the width of the groove portion 53*a* is larger than the total thickness of the extension portion 50*d* and the elastic body 51, and the extension portion 50*d* can move in the Y-axis direction with respect to the sensor support member 53 by the clearance of the groove portion 53*a*. When the side surface of the extension portion 50*d* or the elastic body 51 comes into contact with the inner surfaces of the groove portion 53*a*, the string support member 50 is restricted from further movement in the Y-axis directions.

The elastic body 51 has the same role as the elastic body 35 of the first embodiment (FIG. 3). The elastic body 51 abuts against the inner surface of the groove portion 53*a* to suppress collision noise. In addition, the elastic body 51 facilitates damping of the vibration of the string support member 50, thereby reducing vibration noise. Excessive deformation of the string support member 50 is suppressed by the inner surface of the groove portion 53*a*, and the elastic body 51 can absorb the string plucking force on the string member 15 that exceeds the allowable range.

The sensor support member 53 has a pedestal portion 53*b* in which the groove portions 53*a* are formed, and a support plate portion 53*c* protruding from the pedestal portion 53*b* in the Z-axis direction. A plurality (six) of magnetic sensors 54 are provided at intervals in the Y-axis direction on the support plate portion 53*c*. Each magnetic sensor 54 is arranged at a position facing the permanent magnet 52 of the corresponding string support member 50 in the X-axis direction.

The magnetic sensors 54 constitute the string operation detector 16 (FIG. 1). When the string member 15 is plucked, the string support member 50 bends, and when the string support member 50 bends and the position of the permanent magnet 52 changes, the change in the magnetic field is detected by the magnetic sensor 54. A Hall element, a Hall IC, a coil, or the like can be used as the magnetic sensor 54. Since these devices generate a voltage according to a change in magnetic flux density caused by a relative positional change between the magnetic sensor 54 and the permanent magnet 52, the displacement of the string support member 50 accompanying the plucking of the string member 15 can be detected by the magnetic sensor 54.

For example, when a coil is used as the magnetic sensor 54, a voltage waveform similar to that obtained when the piezoelectric sensor 36 described above is used can be obtained. Since the change in the magnetic field differs depending on the direction in which the permanent magnet 52 moves, the plucking direction of the string member 15 can be detected based on the output from the coil of the magnetic sensor 54.

The configuration of FIG. 9 is a so-called moving magnet type detection structure in which a permanent magnet 52 is provided in the string support member 50, which is a movable part. This structure is advantageous in that since the wiring extending from the magnetic sensor 54 is on the side of the fixed sensor support member 53 and the wiring is not connected to the side of the movable string support member 50, the operating resistance is small, and an electronic system that includes magnetic sensors 54 is not stressed. However, even if the string support member 50 is provided with the magnetic sensor 54 and the sensor support member 53 is provided with the permanent magnet 52, the operation of the string support member 50 can be detected. Such a configuration is not excluded in this disclosure.

The fifth embodiment shown in FIG. 10 has the same structure as the fourth embodiment shown in FIG. 9 except for the constituent elements of the string operation detector 16. Parts common to the configuration of FIG. 9 are denoted by the same reference numerals in FIG. 10, and description thereof is omitted.

The string support member 50 has a reflector 55 extending in the X-axis direction from the extension portion 50*d*. The string support member 50 and the reflector 55 are integrally formed. A structure in which the reflector 55 formed as a separate member is attached to the string support member 50 may be employed instead. The reflector 55 has a flat plate shape with both sides facing in the Z-axis directions.

A support plate portion 53*d* is provided on the pedestal portion 53*b* of the sensor support member 53, and a plurality (six) of reflective optical sensors 56 are provided on the support plate portion 53*d* at intervals in the Y-axis direction. Each reflective optical sensor 56 is arranged at a position facing the reflector 55 of the corresponding string support member 50 in the Z-axis direction. In the reflective optical sensor 56, a light-emitting portion 56*a* and a light-receiving portion 56*b* are arranged side by side in the Y-axis direction. The light emitting portion 56*a* has a light source such as an LED, and projects light toward the reflector 55. The light receiving section 56*b* includes a photoelectric conversion element that converts light energy into electrical energy.

The reflective optical sensors 56 constitute the string operation detector 16 (FIG. 1). Light emitted from the light emitting portion 56*a* of the reflective optical sensor 56 is reflected by the reflector 55 and received by the light receiving portion 56*b*. When the string member 15 is plucked, the string support member 50 bends, and when the position of the reflector 55 changes with the bending of the string support member 50, the amount of light received by the light receiving portion 56*b* changes. The movement of the string member 15 can be detected by analyzing the variations in the amount of the received light.

The sixth embodiment shown in FIG. 11 has the same structure as the fourth embodiment shown in FIG. 9 except for the constituent elements of the string operation detector 16. Parts common to the configuration of FIG. 9 are denoted by the same reference numerals in FIG. 11, and description thereof is omitted.

The string support member 50 has a light shielding plate 57 extending in the X-axis direction from the extended portion 50*d*. The string support member 50 and the light shielding plate 57 are integrally formed. A structure in which the light shielding plate 57 formed as a separate member is attached to the string support member 50 may be employed instead. The light shielding plate 57 has a flat plate shape with respective sides facing in the Z-axis directions.

A support plate portion 53*e* is provided on the pedestal portion 53*b* of the sensor support member 53, and a plurality (six) of transmissive optical sensors 58 are provided on a side surface of the support plate portion 53*e* at intervals in the Y-axis direction. Each transmissive optical sensor 58 has a light-emitting portion 58*a* and a light-receiving portion 58*b* that are spaced apart in the Z-axis direction and face each other.

The transmissive optical sensors 58 constitute the string operation detector 16 (FIG. 1). The light emitted from the light emitting portion 58*a* of the transmissive optical sensor 58 is blocked at a portion where the light shielding plate 57 exists, and is received by the light receiving portion 58*b* at a portion where the light shielding plate 57 is absent. When the string member 15 is plucked, the string support member 50 bends, and the position of the light shielding plate 57 changes due to the bending of the string support member 50. As a result, the amount of light received by the light receiving portion 58*b* changes. The movement of the string member 15 can be detected by analyzing the variation in the amount of the received light.

A plurality of slit-shaped holes may be formed in each light shielding plate 57 at intervals in the Y-axis direction. These holes penetrate in the Z-axis direction, and the light receiving portion 58*b* receives light in the form of pulses in this case. Therefore, the vibration speed of the string member 15 can be detected based on the light receiving period of the pulses.

Because the reflective optical sensor 56 shown in FIG. 10 and the transmissive optical sensor 58 shown in FIG. 11 do not output the positive/negative voltage of the piezoelectric sensor 36, there may be cases where detection of the plucking directions of the string member 15 is difficult. In such a case, as a countermeasure, an auxiliary sensor that detects the moving direction of the string support member 50 may be provided.

In each of the configurations shown in FIGS. 9 to 11, an electrical connection may be provided between the string member 15 and the string support members 50, and a capacitance sensor (not shown) may be connected to the string support member 50 so as to detect the mute operation of the string members 15.

In the configurations shown in FIGS. 9 to 11, a pair of magnetic sensors 54, a pair of reflective optical sensors 56, and a pair of transmissive optical sensors 58, which are detectors provided near the respective ends of each string support member 50 individually detect changes in the positions of the permanent magnet 52, the reflector 55, and the light shielding plate 57, which are objects to be detected, respectively, in each string support member 50. Therefore, with respect to the accuracy of detecting the motion of the string member 15 using the string operation detector 16 and the degree of freedom of musical tone control based on the detection result of the string operation detector 16, effects similar to those of the above-mentioned first to third embodiments can be obtained. Furthermore, in a conventional electronic stringed instrument, even if the string is plucked with the same strength, for example, if the string is plucked near one end in the longitudinal direction of the string member, a portion of the string near the plucked position moves greatly, and a portion of the string farther away moves less, thereby producing a bias. This causes the sensor outputs to undesirably change. Because of this, the detection accuracy of the string plucking tended to be unstable, and musical tone control faithful to the player's performance was difficult. The present invention makes it possible to provide more accurate, stable, and faithful detection of the player's performance. In at least some of the embodiments, the plucked position can be estimated with high accuracy, and musical tone control reflecting the estimated plucked position becomes possible.

Further, each of the embodiments described above has its own advantages, and a suitable configuration can be selected as the case may be. Moreover, it is also possible to appropriately combine the configurations of the respective embodiments.

In the first embodiment (FIGS. 3 and 4), the second embodiment (FIG. 7), and the third embodiment (FIG. 8), a pair of piezoelectric sensors 36 respectively attached to a pair of string support members 32 (40, 42) constitutes the string operation detectors 16, which has the advantage that the number of parts is small and the peripheral structure of the string member 15 can be simplified.

In the first embodiment, the pair of string support members 32 that support the string member 15 are both in the form of simple flat plates, so the unit cost of the parts is low and the durability is excellent. In the second and third embodiments, the string members 15 are supported by a pair of string support members 40 and a pair of string support members 42, which are also easily deformable in directions other than the Y-axis direction, so that various playing styles can be detected with ease.

In the fourth embodiment (FIG. 9), the fifth embodiment (FIG. 10), and the sixth embodiment (FIG. 11), an object the movement of which is to be detected (the permanent magnet 52, the reflector plate 55, the light shielding plate 57) is provided to each of the pair of string support members 50, respectively, which are movable portions that move along with the string members 15, and the string operation detector 16 (the magnetic sensor 54, the reflective optical sensor 56, and the transmissive optical sensor 58) are provided in the sensor support member 53, which is a fixed portion that does not move along with the string member 15. Since the moving object and the string operation detector 16 are not in contact with each other, and no wiring or the like is required to connect to the moving object, the weight of the moving parts can be reduced and the motion response can be improved.

By using the piezoelectric sensor 36 of the first to third embodiments and the magnetic sensor 54 (coil) of the fourth embodiment, not only the vibration intensity of the string member 15, but also the vibration direction can be relatively easily detected.

The above-described embodiments are specific examples for ease of understanding of the invention, but the invention is not limited to these embodiments, and various modifications and changes can be made without departing from the scope of the invention. Modifications and changes are possible. Some of the examples are as follows.

In each of the above-described embodiments, the multiple string members 15 have the same specifications, and the support structure for supporting each string member 15 is also the same. The use of common parts makes it possible to reduce the manufacturing cost and improve maintainability. In addition, since the string operating section 13 has a symmetrical structure in the Y-axis direction, it is not necessary to change the string arrangement when the right-hand picking style setting is changed to the left-hand picking style setting and vice versa, which would be necessary for a real guitar.

However, it is also possible to use different support structures for supporting multiple string members. For example, when the string support member is a leaf spring, the flexibility of the leaf spring can be varied by varying the thickness of the leaf spring, the width of the leaf spring, the material forming the leaf spring, and the like. As a result, it is possible to vary the operational resistance and repulsion of the plurality of string members when plucked and to thereby customize the operation feeling for every string member, if desired.

In each of the above-described embodiments, a pair of sensors with the same specifications are provided on the respective ends of each string member 15 in the longitudinal direction. When the pair of sensors have the same specifications, the introduction cost can be low and the burden of control can be reduced. In particular, since signals output from a plurality of sensors are mutually referenced and used for tone control, it is advantageous from the viewpoint of ease of control and detection accuracy when each sensor has the same specifications.

However, unlike each of the above-described embodiments, the present invention is also useful in a configuration in which a plurality of detectors with different types and specifications are provided for the respective string members. The plurality of detectors only need to satisfy the requirement of outputting signals corresponding to the deformation of the plurality of string support members. Therefore, the form of the signals and the method of detection are not particularly limited in the present disclosure.

In each embodiment described above, a pair of string support members are connected to the respective ends of the string member 15. This configuration has the following advantages: high stability of the string member 15, smooth operation of the string member 15 when the string is plucked, wide pluckable range of the string member 15, and high detection accuracy by the string operation detector 16.

However, in addition to the above-described embodiments, in the present invention, a structure in which the string member is supported by a pair of string support members that are disposed at positions other than the respective ends of the string member (at positions closer to each other than the terminal ends of the string member) as well as a structure in which the string member is supported by three or more string support members at three or more locations along the longitudinal direction of the string member are also possible. The present invention is useful even in such configurations. That is, the string member support structure of the present invention may merely have a plurality of string support members that support the string member at different positions in the longitudinal direction, and may merely need to satisfy the requirement that each string support member deforms when the corresponding string member is plucked.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic stringed instrument, comprising:

at least one linear string member to be plucked by a user;

a plurality of string support members each supporting the string member at different positions in a longitudinal direction of the string member, each of the string support members being individually deformable in accordance with a plucking of the string member by the user;

a plurality of sensors that output signals indicating respective deformation states of the plurality of string support members in accordance with a way the string member is plucked; and at least one processor configured to generate a musical tone control signal based on the signals output from the plurality of sensors, wherein the at least one processor estimates a plucked position in the longitudinal direction of the string member based on the signals output from the plurality of sensors, and generate the musical tone control signal that reflects the estimated plucked position.

2. The electronic stringed instrument according to claim 1, wherein the plurality of string support members support the string member at respective ends, in the longitudinal direction, of the string member.

3. The electronic stringed instrument according to claim 2, wherein each of the plurality of string support members has one of the plurality of sensors attached thereto so that the one of the plurality of sensors outputs a signal representing the deformation state of the string support member to which the sensor is attached.

4. The electronic stringed instrument according to claim 2, wherein each of the plurality of string support members has one of the plurality of sensors provided adjacent thereto, so that the one of the plurality of sensors outputs a signal representing the deformation state of the string support member adjacent to which the sensor is provided.

5. The electronic stringed instrument according to claim 1, wherein the at least one processor is configured to generate the musical tone control signal based on an average value of the signals output from the plurality of sensors.

6. The electronic stringed instrument according to claim 1, wherein the at least one processor is configured to generate the musical tone control signal that controls frequency characteristics of a musical tone based on the estimated plucked position.

7. The electronic stringed instrument according to claim 1, wherein the at least one processor is configured to generate the musical tone control signal that controls a tone color of a musical tone based on the estimated plucked position.

8. The electronic stringed instrument according to claim 1, wherein the respective deformation states of the plurality of string support members depend on the way the string member is plucked.

9. A method performed by at least one processor in an electronic stringed instrument that includes, in addition to at least one processor, at least one linear string member to be plucked by a user; a plurality of string support members each supporting the string member at different positions in a longitudinal direction of the string member, each of the string support members being individually deformable in accordance with a plucking of the string member by the user; and a plurality of sensors that output signals indicating respective deformation states of the plurality of string support members in accordance with a way the string member is plucked, the method comprising, via the at least one processor:

receiving the signals indicating the respective deformation states of the plurality of string support members outputted from the plurality of sensors; and generating a musical tone control signal based on the received signals, wherein the method further comprises, via the at least one processor, estimating a plucked position in the longitudinal direction of the string member based on the signals output from the plurality of sensors, and the generated musical tone control signal reflects the estimated plucked position.

10. The method according to claim 9, wherein the plurality of string support members support the string member at respective ends, in the longitudinal direction, of the string member.

11. The method according to claim 10, wherein each of the plurality of string support members has one of the plurality of sensors attached thereto so that the one of the plurality of sensors outputs a signal representing the deformation state of the string support member to which the sensor is attached.

12. The method according to claim 10, wherein each of the plurality of string support members has one of the plurality of sensors provided adjacent thereto, so that the one of the plurality of sensors outputs a signal representing the deformation state of the string support member adjacent to which the sensor is provided.

13. The method according to claim 9, wherein the musical tone control signal is generated based on an average value of the signals output from the plurality of sensors.

14. The method according to claim 9, wherein the generated musical tone control signal controls frequency characteristics of a musical tone based on the estimated plucked position.

15. The method according to claim 9, wherein the generated musical tone control signal controls a tone color of a musical tone based on the estimated plucked position.

16. The method according to claim 9, wherein the respective deformation states of the plurality of string support members depend on the way the string member is plucked.

17. A non-transitory computer-readable recording medium storing a program therein, the program being readable by at least one processor in an electronic stringed instrument that includes, in addition to at least one processor, at least one linear string member to be plucked by a user; a plurality of string support members each supporting the string member at different positions in a longitudinal direction of the string member, each of the string support members being individually deformable in accordance with a plucking of the string member by the user; and a plurality of sensors that output signals indicating respective deformation states of the plurality of string support members in accordance with a way the string member is plucked, the program being configured to causes the at least one processor to perform the following:

receiving the signals indicating the respective deformation states of the plurality of string support members outputted from the plurality of sensors; and generating a musical tone control signal based on the received signals, wherein the program further causes the at least one processor to estimate a plucked position in the longitudinal direction of the string member based on the signals output from the plurality of sensors, and the generated musical tone control signal reflects the estimated plucked position.

18. The non-transitory computer-readable recording medium according to claim 17, wherein the respective deformation states of the plurality of string support members depend on the way the string member is plucked.

* * * * *